(12) United States Patent
Yi et al.

(10) Patent No.: US 10,796,005 B1
(45) Date of Patent: Oct. 6, 2020

(54) METHOD OF APPLICATION SECURITY VULNERABILITY EVALUATION BASED ON TREE BOOSTING, AND READABLE MEDIUM AND APPARATUS FOR PERFORMING THE METHOD

(71) Applicant: Foundation of Soongsil University-Industry Cooperation, Seoul (KR)

(72) Inventors: Jeong Hyun Yi, Seongnam-si (KR); Kichang Kim, Icheon-si (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 0 days.

(21) Appl. No.: 16/527,687

(22) Filed: Jul. 31, 2019

(30) Foreign Application Priority Data

Apr. 25, 2019 (KR) ........................ 10-2019-0048174

(51) Int. Cl.
| | | |
|---|---|---|
| *G06F 21/00* | (2013.01) | |
| *G06F 21/57* | (2013.01) | |
| *G06F 16/23* | (2019.01) | |
| *G06N 20/20* | (2019.01) | |

(52) U.S. Cl.
CPC ........ *G06F 21/577* (2013.01); *G06F 16/2379* (2019.01); *G06N 20/20* (2019.01); *G06F 2221/033* (2013.01)

(58) Field of Classification Search
CPC ............... G06F 21/577; G06F 16/2379; G06F 2221/033; G06N 20/20
See application file for complete search history.

(56) References Cited

U.S. PATENT DOCUMENTS

| | | | |
|---|---|---|---|
| 7,287,012 B2 | 10/2007 | Corston et al. | |
| 10,599,844 B2* | 3/2020 | Schmidtler | ........... G06F 21/562 |
| 2006/0094044 A1* | 5/2006 | Chakraborty | .......... G16B 40/00 435/6.16 |
| 2008/0086272 A1* | 4/2008 | Fillet | ...................... G16B 20/00 702/19 |
| 2010/0125570 A1* | 5/2010 | Chapelle | ............... G06F 16/951 707/722 |
| 2017/0372069 A1* | 12/2017 | Lin | ........................ G06F 21/564 |

(Continued)

FOREIGN PATENT DOCUMENTS

| | | |
|---|---|---|
| KR | 10-1256468 B1 | 4/2013 |
| KR | 10-1537088 B1 | 7/2015 |

(Continued)

*Primary Examiner* — John B King
(74) *Attorney, Agent, or Firm* — Novick, Kim & Lee, PLLC; Sang Ho Lee (57) ABSTRACT

Provided is a method of application security vulnerability evaluation based on tree boosting and a readable medium and an apparatus for performing the same. The method of application security vulnerability evaluation based on tree boosting includes the step of generating an API classifier which classifies an input API as benign or malicious using a tree boosting-based algorithm, the step of calculating security vulnerability score of API using the API classifier, and the step of classifying a target application as a malicious application or a benign application according to the security vulnerability score of API used in the target application.

10 Claims, 6 Drawing Sheets

(56) References Cited

U.S. PATENT DOCUMENTS

| | | | | |
|---|---|---|---|---|
| 2018/0165554 A1* | 6/2018 | Zhang | ................. | G06K 9/6256 |
| 2018/0248905 A1* | 8/2018 | Cote | ................... | G06K 9/6269 |
| 2018/0285773 A1* | 10/2018 | Hsiao | ...................... | G06N 5/04 |
| 2018/0357559 A1 | 12/2018 | Truong et al. | | |
| 2019/0007434 A1* | 1/2019 | McLane | ............. | H04L 63/1416 |
| 2019/0018960 A1* | 1/2019 | Chistyakov | ............. | G06F 21/57 |
| 2019/0114419 A1* | 4/2019 | Chistyakov | ........... | G06F 21/564 |
| 2019/0114539 A1* | 4/2019 | Chistyakov | ............ | G06N 20/00 |
| 2019/0205905 A1* | 7/2019 | Raghunathan | ....... | G06N 3/0454 |
| 2019/0268305 A1* | 8/2019 | Xu | ......................... | H04L 63/20 |
| 2020/0004961 A1* | 1/2020 | Prokudin | ............. | G06F 21/562 |

FOREIGN PATENT DOCUMENTS

| | | |
|---|---|---|
| KR | 10-2017-0086926 A | 7/2017 |
| KR | 10-2017-0108330 A | 9/2017 |
| KR | 10-1966614 B1 | 4/2019 |
| WO | 2017/090194 A1 | 6/2017 |

* cited by examiner

METHOD OF APPLICATION SECURITY VULNERABILITY EVALUATION BASED ON TREE BOOSTING, AND READABLE MEDIUM AND APPARATUS FOR PERFORMING THE METHOD

CROSS-REFERENCE TO RELATED APPLICATIONS

This application claims priority under 35 U.S.C. § 119 to Korean Patent Application No. 10-2019-0048174, filed on Apr. 25, 2019, in the Korean Intellectual Property Office, the disclosure of which is incorporated herein by reference in its entirety.

TECHNICAL FIELD

The present disclosure relates to a method of application security vulnerability evaluation based on tree boosting, a readable medium, an apparatus for performing the same, and particularly, a method of application security vulnerability evaluation based on tree boosting for evaluating security vulnerability of an application running on an Android operating system-based mobile device by classifying an Application Programming Interface (API) used in the application using tree boosting-based machine learning, a readable medium and an apparatus for the performing the same.

BACKGROUND

Methods for evaluating security vulnerability of applications running on mobile devices are usually performed by analysis of permissions requested from the applications, description of the applications and the user's review.

However, in the case of the permissions requested from the applications, application developers do not know accurately the meaning and influence of the corresponding permissions, and unnecessary permission requests may affect the evaluation irrespective of the actual behaviors of the applications.

The description of the applications is written by the developers' subjective opinions, and the users' reviews are written by many unspecified users and also have low objectiveness, does not conduct a background service evaluation, which fails to fully reflect the behaviors of the applications.

As described above, the conventional application security vulnerability evaluation methods have limitations in accurately reflecting and evaluating the actual behaviors of the applications.

SUMMARY

An aspect of the present disclosure provides a method of application security vulnerability evaluation based on tree boosting for evaluating the security vulnerability of an application based on API used in the application to reflect the actual behaviors of the application, and a readable medium and an apparatus for performing the same.

Another aspect of the present disclosure provides a method of application security vulnerability based on tree boosting for presenting a quantitative security vulnerability evaluation result of an application using an API classifier built by a tree boosting-based algorithm with the Ensemble Technique, a readable medium, and an apparatus for performing the same.

The technical problem of the present disclosure is not limited to the above-mentioned technical problem, and other technical problems not mentioned herein will be clearly understood by those skilled in the art from the following description.

To solve the above-described problem, a method of application security vulnerability evaluation based on tree boosting according to the present disclosure is a method of security vulnerability evaluation in an apparatus for application security vulnerability evaluation based on tree boosting which classifies an application as a malicious application or a benign application by the step of assigning security vulnerability score indicating security vulnerability in a quantitative value to API used in the application, including generating an API classifier which classifies an input API as benign or malicious using a tree boosting-based algorithm, the step of assigning security vulnerability score to the API inputted into the API classifier according to a benign or malicious classification result of the corresponding API and storing in a database, the step of calculating security vulnerability score of API used in a target application using the security vulnerability scores for each API stored in the database, and the step of classifying the target application as a malicious application or a benign application according to the security vulnerability score of the API used in the target application.

Meanwhile, the method of application security vulnerability evaluation based on tree boosting may further include the step of adding the API used in the target application as a training dataset used to generate the API classifier, when the target application is classified as a malicious application.

Additionally, the step of generating the API classifier which classifies the input API as benign or malicious using the tree boosting-based algorithm may include the step of extracting the API used in the application classified as a malicious application or a benign application and generates into a training dataset, the step of generating an API classifier by learning the training dataset with the tree boosting-based algorithm, and the step of generating a plurality of API classifiers by repeating the generation of the API classifier by learning the training dataset with the tree boosting-based algorithm to construct an Ensemble Model.

Additionally, the step of assigning the security vulnerability score to the API inputted into the API classifier according to the benign or malicious classification results of the corresponding API and storing in the database may include the step of extracting APIs used in all applications provided from an Android reference site to generate a target dataset, the step of inputting the target dataset into the Ensemble Model to obtain a benign or malicious classification result for each API that constitutes the target dataset for each of the plurality of API classifiers that constitutes the Ensemble Model, the step of calculating security vulnerability scores for each API that constitutes the target dataset by averaging the benign or malicious classification results for each API that constitutes the target dataset acquired for each of the plurality of API classifiers, and the step of setting security vulnerability rankings divided according to the security vulnerability scores, and mapping the security vulnerability rankings to each API that constitutes the target dataset according to the security vulnerability scores and storing in the database.

Additionally, the step of calculating the security vulnerability score of the API used in the target application using the security vulnerability scores for each API stored in the database may include the step of extracting all APIs used in the target application to generate an API list, and averaging the security vulnerability scores of each API included in the API list using the database and calculating as the security vulnerability score of the API used in the target application.

There is a provided computer-readable recording medium having recorded thereon a computer program for the method of application security vulnerability evaluation based on tree boosting.

Meanwhile, an apparatus for application security vulnerability evaluation based on tree boosting according to the present disclosure includes an API learning unit which generates an API classifier which classifies an input API as benign or malicious using a tree boosting-based algorithm, and assigns security vulnerability score to the API inputted into the API classifier according to a benign or malicious classification result of the corresponding API and stores into a database, and an API evaluation unit which calculates security vulnerability score of API used in a target application using the security vulnerability scores for each API stored in the database, and classifies the target application as a malicious application or a benign application according to the security vulnerability score of the API used in the target application.

Meanwhile, the apparatus for application security vulnerability evaluation based on tree boosting may further include a dataset update unit which adds the API used in the target application as a training dataset used to generate the API classifier when the target application is classified as a malicious application.

Additionally, the API learning unit may include an API classifying unit which extracts API used in an application classified as a malicious application or a benign application and generates into a training dataset, extracts APIs used in all applications provided form an Android reference site to generate a target dataset, generates a plurality of API classifiers by learning the training dataset with a tree boosting-based algorithm to construct an Ensemble Model, obtains benign or malicious classification results for each API which constitutes the target dataset for each of the plurality of API classifiers, and calculates security vulnerability scores for each API which constitutes the target dataset, and a security vulnerability ranking generation unit which sets security vulnerability rankings divided according to the security vulnerability scores, and maps the security vulnerability rankings to each API that constitutes the target dataset according to the security vulnerability scores and stores in the database.

Additionally, the API evaluation unit may include an API extraction unit which extracts all APIs used in the target application to generate an API list, a security vulnerability score calculation unit which averages the security vulnerability scores of each API included in the API list using the database and calculates as the security vulnerability score of the API used in the target application, an application evaluation unit which classifies the target application as a malicious application or a benign application according to the security vulnerability score of the API used in the target application, and a model validation unit which sets a classification reference score of a malicious application or a benign application for the security vulnerability score of the API used in the target application.

According to an aspect of the present disclosure, it is possible to evaluate the actual behaviors of an application more accurately through the analysis based on API of the application.

In addition, according to another aspect of the present disclosure, it is possible to present quantitative classification results with higher accuracy than the conventional API-based application evaluation technologies by using an API classifier built by a tree boosting-based algorithm with the Ensemble Technique, thereby ensuring objectivity of evaluation results.

DETAILED DESCRIPTION OF EMBODIMENTS

The following detailed description of the present disclosure is made with reference to the accompanying drawings, in which particular embodiments for practicing the present disclosure are shown for illustration purposes. These embodiments are described in sufficient detail for those skilled in the art to practice the present disclosure. It should be understood that various embodiments of the present disclosure are different but do not need to be mutually exclusive. For example, particular shapes, structures and features described herein in connection with one embodiment can be embodied in other embodiment without departing from the spirit and scope of the present disclosure. It should be further understood that changes can be made to positions or placement of individual elements in each disclosed embodiment without departing from the spirit and scope of the present disclosure. Therefore, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects.

Hereinafter, the preferred embodiments of the present disclosure will be described in more detail with reference to the accompanying drawings.

The term "unit" is defined herein as having its broadest definition to an ordinary skill in the art to refer to a software including instructions executable in a non-transitory computer readable medium that would perform the associated function when executed, a circuit designed to perform the associated function, a hardware having a processor and a memory designed to perform the associated function, or a combination of a software, a circuit, or a hardware designed to perform the associated function.

Figure 1:
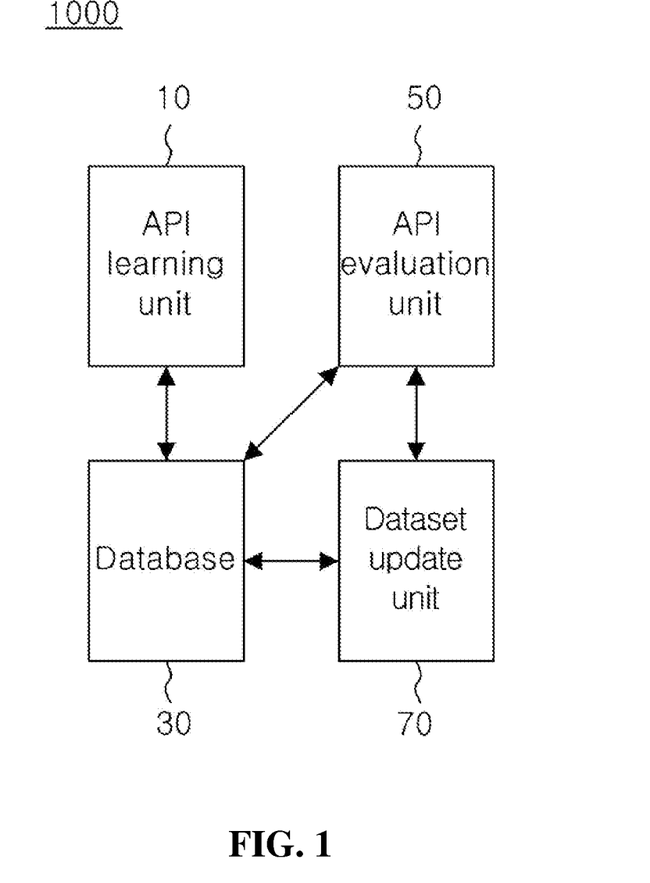
FIG. 1 is a block diagram of an apparatus for application security vulnerability evaluation based on tree boosting according to an embodiment of the present disclosure.

FIG. 1 is a block diagram of an apparatus for application security vulnerability evaluation based on tree boosting according to an embodiment of the present disclosure.

Referring to FIG. 1, the apparatus 1000 for application security vulnerability evaluation based on tree boosting according to an embodiment of the present disclosure may include API learning unit 10, a database 30, an API evaluation unit 50 and a dataset update unit 70.

The apparatus 1000 for application security vulnerability evaluation based on tree boosting according to an embodiment of the present disclosure may be implemented by a larger number of components than the components shown in FIG. 1, and may be implemented by a smaller number of components.

The apparatus 1000 for application security vulnerability evaluation based on tree boosting according to an embodiment of the present disclosure is an apparatus capable of inputting and outputting information, software (application) for application security vulnerability evaluation may be installed and run on the apparatus 1000, and the API learning unit 10, the API evaluation unit 50 and the dataset update unit 70 shown in FIG. 1 may be controlled by the software running on the apparatus 1000 according to an embodiment of the present disclosure.

The apparatus 1000 for application security vulnerability evaluation based on tree boosting according to an embodiment of the present disclosure may generate an API classifier to evaluate an application based on Application Programming Interface (API) used in the application. In this instance, the API classifier may indicate security vulnerability of an input API in a quantitative value using a tree boosting-based algorithm with the Ensemble Technique.

Thus, the apparatus 1000 for application security vulnerability evaluation based on tree boosting according to an embodiment of the present disclosure may calculate security vulnerability scores for each API using the API classifier, and store APIs for each security vulnerability ranking divided according to the security vulnerability scores to build a database.

The apparatus 1000 for application security vulnerability evaluation based on tree boosting according to an embodiment of the present disclosure may identify the security vulnerability ranking mapped with API used in a target application from the database and present a quantitative classification results for the target application.

The operation of the apparatus 1000 for application security vulnerability evaluation based on tree boosting according to an embodiment of the present disclosure will be described in brief with reference to FIG. 2.

Figure 2:
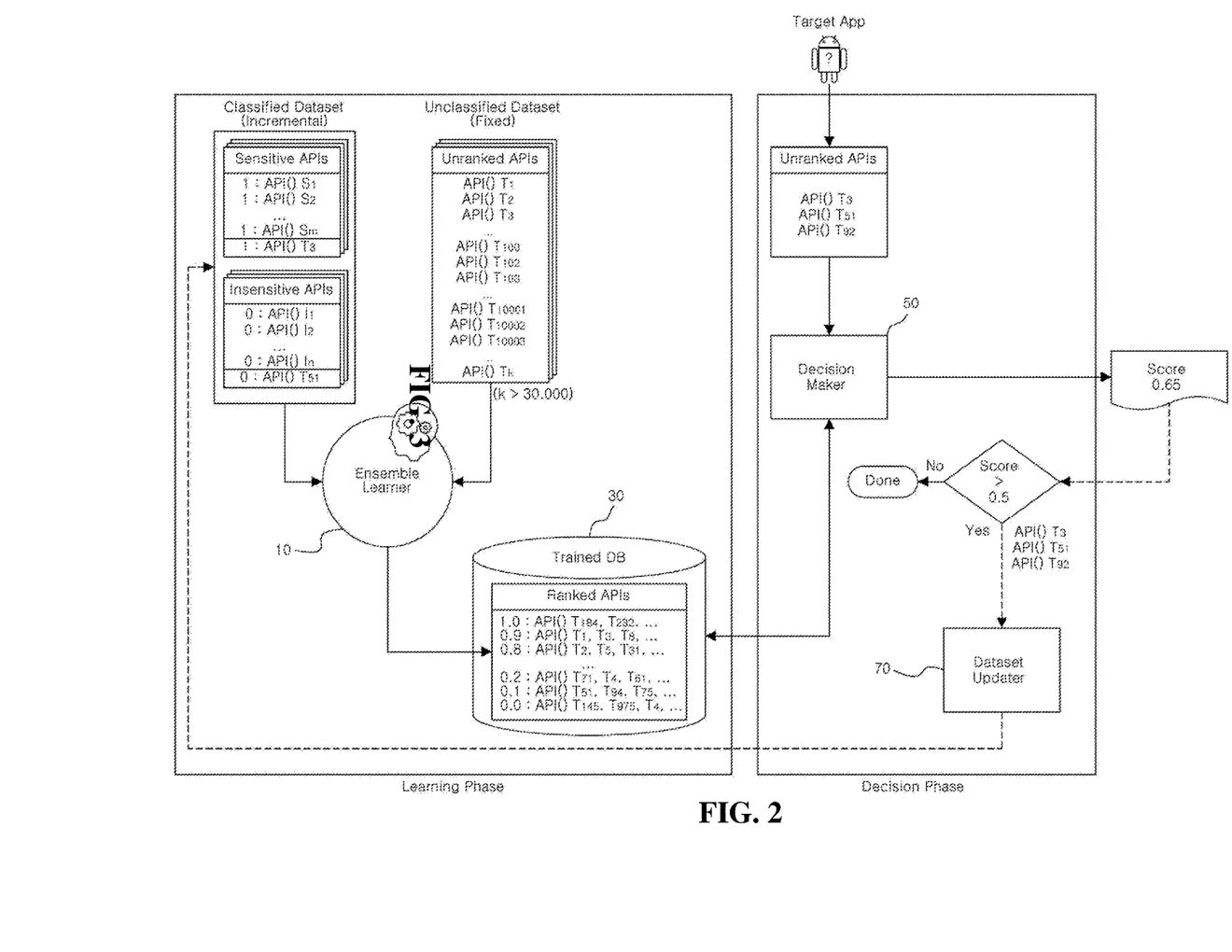
FIG. 2 is a schematic diagram illustrating an application classification method in the apparatus for application security vulnerability evaluation based on tree boosting according to an embodiment of the present disclosure as shown in FIG. 1.

FIG. 2 is a schematic diagram illustrating an application classification method in the apparatus for application security vulnerability evaluation based on tree boosting according to an embodiment of the present disclosure as shown in FIG. 1.

Referring to FIG. 2, the API learning unit 10 may generate an API classifier using, as a training dataset, API extracted from an application pre-classified as a benign application or a malicious application.

The API learning unit 10 may generate a plurality of API classifiers by learning the training dataset according to a tree boosting-based algorithm with the Ensemble Technique. Each API classifier may classify an input API as malicious or benign.

The API learning unit 10 may collect all APIs provided from a reference site of an Android application, and calculate security vulnerability scores of each API by inputting into the API classifier. For example, the API learning unit 10 may calculate security vulnerability score of API by averaging the benign or malicious classification results of the plurality of API classifiers for the corresponding API.

The API learning unit 10 may store API for each security vulnerability ranking divided according to the security vulnerability score to build the database 30.

The API evaluation unit 50 may extract API used in a target application, and obtain security vulnerability ranking corresponding to the API extracted from the database 30. The API evaluation unit 50 may evaluate the target application as a malicious application or a benign application according to the security vulnerability ranking of the API used in the target application.

When the target application is evaluated as a malicious application by the API evaluation unit 50, the dataset update unit 70 may add the API of the target application as the training dataset used to train the API classifier.

The apparatus 1000 for application security vulnerability evaluation based on tree boosting according to an embodiment of the present disclosure may evaluate the actual behaviors of the application more accurately through analysis based on the API of the application. In addition, the apparatus 1000 for application security vulnerability evaluation based on tree boosting according to an embodiment of the present disclosure may present quantitative classification results with higher accuracy than the conventional API-based application evaluation technologies by using the API classifier built by the tree boosting-based algorithm with the Ensemble Technique, thereby ensuring objectivity of evaluation results.

Hereinafter, each component of the apparatus 1000 for application security vulnerability evaluation based on tree boosting according to an embodiment of the present disclosure as shown in FIG. 1 will be described in detail.

The API learning unit 10 may generate an API classifier that classifies an input API as benign or malicious.

The API learning unit 10 may learn a training dataset with a tree boosting-based algorithm and generate an API classifier. The training dataset may include API feature information of applications classified as malicious applications or benign applications. Here, the API feature information may include the API name, package to which the API belongs, class to which the API belongs and description of the API.

The API learning unit 10 may generate a plurality of API classifiers to construct an Ensemble Model. This embodiment is described, taking the API learning unit 10 generates ten API classifiers as an example.

The API learning unit 10 may input the target dataset into the plurality of API classifiers to calculate security vulnerability scores for each API. The target dataset may include feature information of all APIs provided at a reference site of an Android application.

The API learning unit 10 may set security vulnerability rankings divided according to the security vulnerability scores, and map each API that constitutes the target dataset to the security vulnerability rankings according to the security vulnerability scores and store it.

The detailed description relating to the API learning unit 10 will be provided with reference to FIGS. 3 and 4 below.

The database 30 may be built by the API learning unit 10, and may map and store API feature information for each security vulnerability ranking.

For example, the security vulnerability ranking may be divided into 11 in total from 0.0 to 1.0 according to the security vulnerability score, and API assigned with the security vulnerability score corresponding to each security vulnerability ranking may be mapped and stored.

The API evaluation unit 50 may evaluate a target application as a malicious application or a benign application according to the security vulnerability ranking of API used in the target application.

The detailed description relating to the API evaluation unit 50 will be provided with reference to FIG. 5 below.

When the target application is evaluated as a malicious application by the API evaluation unit 50, the dataset update unit 70 may add API of the target application as the training dataset used to train the API classifier.

Figure 3:
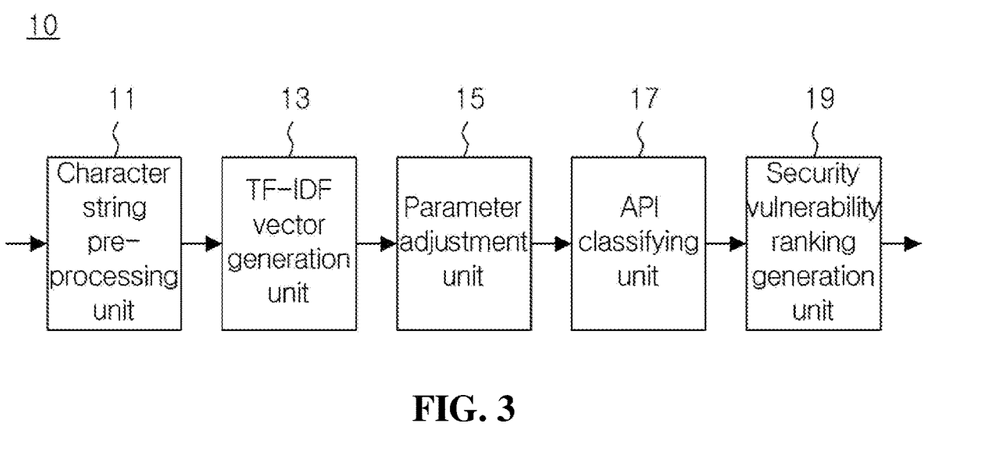
FIG. 3 is a detailed block diagram of an API learning unit shown in FIG. 1.

FIG. 3 is a detailed block diagram of the API learning unit shown in FIG. 1.

Referring to FIG. 3, the API learning unit 10 may include a character string pre-processing unit 11, a Term Frequency-Inverse Document Frequency (TF-IDF) vector generation unit 13, a parameter adjustment unit 15, an API classifying unit 17 and a security vulnerability ranking generation unit 19.

The character string pre-processing unit 11 may pre-process the form of API feature information that constitutes a training dataset or a target dataset.

The training dataset is used to train the API classifier, and the target dataset is used in the classification using the API classifier, and thus it is desirable that the training dataset and the target dataset are modified to a form that can used in machine learning.

The training dataset and the target dataset include API feature information, and the API feature information corresponds to a sentence form. Accordingly, the character string pre-processing unit 11 may perform character string pre-processing on the API feature information that constitutes the training dataset or the target dataset.

For example, the character string pre-processing unit 11 may perform the steps of deleting unnecessary punctuation marks from the API feature information that constitutes the training dataset or the target dataset, tokenization of breaking up character strings into words, deleting stopwords that are meaningless in learning, and stemming of reducing words having grammatically the same meaning to their root form.

The TF-IDF vector generation unit 13 may vectorize the training dataset or the target dataset having undergone character string pre-processing.

Because the training dataset and the target dataset include API feature information, and the API feature information corresponds to a sentence form, vectorization is necessary to input into machine learning. Accordingly, the TF-IDF vector generation unit 13 may vectorize the API feature information that constitutes the training dataset or the target dataset.

In the vectorization of the training dataset or the target dataset, the TF-IDF vector generation unit 13 may calculate the importance of each word in a corresponding document and the entire document group and reflect it on vectorization.

The parameter adjustment unit 15 may find a parameter that can maximize the accuracy of learning or classification of the API classifier and apply it to the API classifier.

The API classifying unit 17 may learn the training dataset and classify the target dataset by applying the parameter determined by the parameter adjustment unit 15.

The API classifying unit 17 may generate the API classifier by learning the training dataset with a tree boosting-based algorithm.

For example, the API classifying unit 17 may randomly recover and extract a predetermined amount of data from the training dataset.

The API classifying unit 17 may learn the extracted training data and generate a Classification And Regression Tree (CART)-based tree.

The API classifying unit 17 may calculate a weight by calculating an objective function of the generated tree, and through this, determine the score of a leaf node and optimize the tree. Here, the objective function may be defined as the following Equation 1.

$$obj(\theta) = \sum_{i=1}^{n} L(y_i, \hat{y}_i) + \sum_{k=1}^{K} \text{ohm}(f_k) \quad \text{[Equation 1]}$$

In Equation 1, the function L denotes a loss function, and ohm denotes the complexity of the model.

The API classifying unit 17 may find a parameter that minimizes the objective function by simplifying Equation 1, and using this, may determine the score of the leaf node that optimizes the tree.

The API classifying unit 17 may determine whether to split the tree by calculating an amount of information acquired when splitting the tree. Here, the amount of information acquired may be defined as the following Equation 2.

$$\text{Gain} = \frac{1}{2}\left[\frac{G_L^2}{H_L+\lambda} + \frac{G_R^2}{H_R+\lambda} - \frac{(G_L+G_R)^2}{H_L+H_R+\lambda}\right] - \gamma \quad \text{[Equation 2]}$$

When the amount of information acquired as shown in Equation 2 exceeds 0, the API classifying unit 17 may determine the depth of the tree by splitting the tree.

When the tree is split and the final shape of the tree model is determined, the API classifying unit 17 may calculate the objective function of the tree again and determine whether to use the tree. When the performance of the classifier is improved by adding the tree determined at the current stage, the API classifying unit 17 may add the tree at the current stage and learn the next tree, and in the contrary case, may terminate the tree generation and definitely determine the final classifier shape.

The API classifying unit 17 may generate the API classifier by learning the training dataset with the tree boosting-based algorithm.

The API classifying unit 17 may generate a plurality of API classifiers to construct an Ensemble Model. As described above, the API learning unit 10 may generate the API classifier by randomly recovering and extracting a predetermined amount of data from the training dataset, and repeat this process ten times to generate a total of ten API classifiers.

The API classifying unit 17 may input the target dataset into each of the ten API classifiers to classify as a malicious or benign API, and calculate security vulnerability score of the corresponding API by combining the classification results of the ten API classifiers. This will be described taking FIG. 4 as an example.

Figure 4:
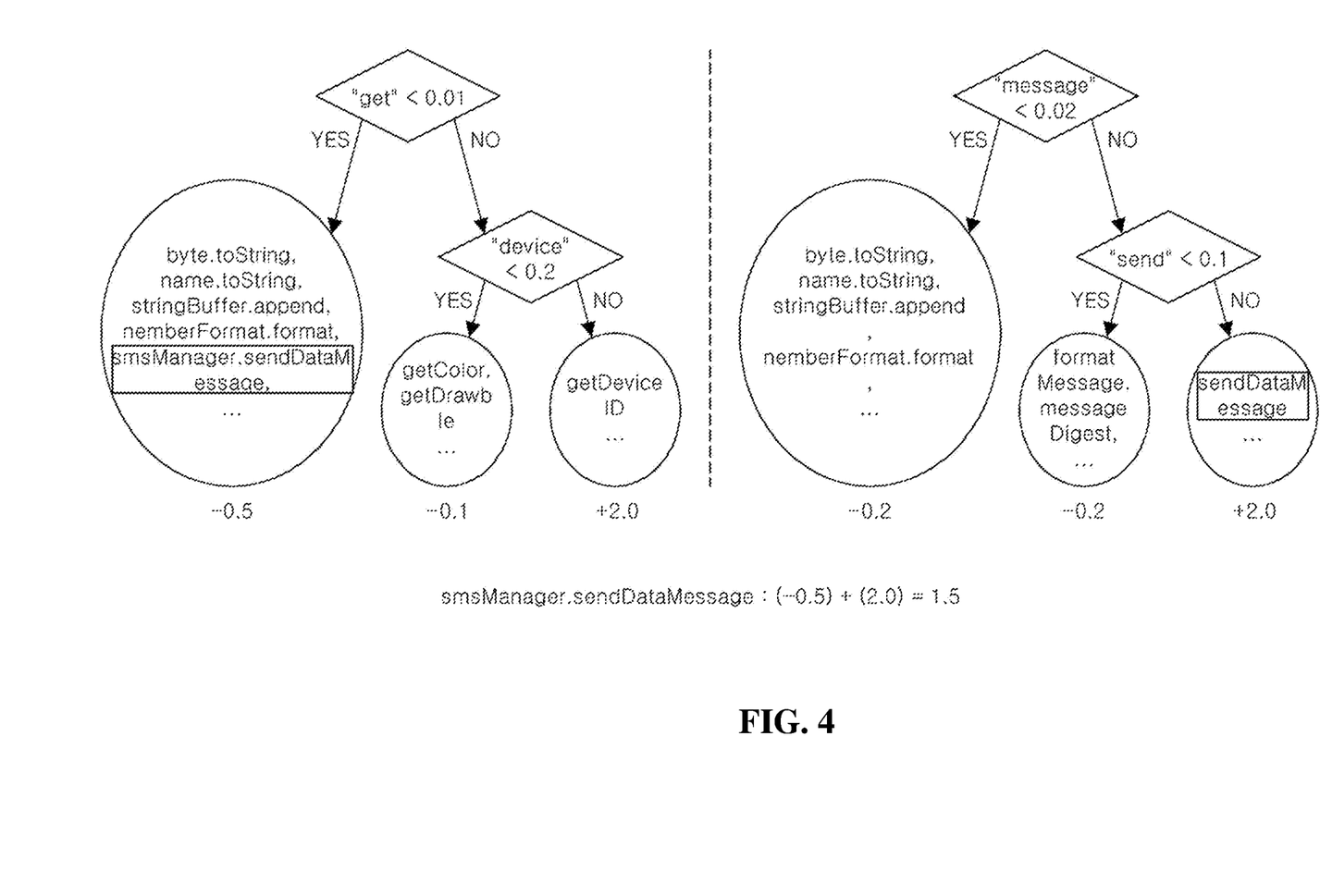
FIG. 4 is a diagram showing an example of classification of a target dataset in an API classifying unit shown in FIG. 3.

FIG. 4 is a diagram showing an example of classification of the target dataset in the API classifying unit shown in FIG. 3.

Referring to FIG. 4, the API classifying unit 17 may classify sendDataMessage API that constitutes the target dataset. The feature information of sendDataMessage API may be shown in the following Table 1.

TABLE 1

| API name | sendDataMessage |
|---|---|
| Package to which API belongs | android.telephony |
| Class to which API belongs | SmsManager |
| Description of API | Send a data based SMS to a specific application port. |

TABLE 1-continued

| API name | sendDataMessage |
| --- | --- |
| Feature information used in classification | send, data, messag, android, manag, base, sms, specif, applic, port |

When the feature information shown in Table 1 is pre-processed by the character string pre-processing unit 11, and vectorized by the TF-IDF vector generation unit 13, it may be converted into {x1, x2, . . . , x10}={send, data, . . . , port}. Here, the values of x1, x2, . . . , x10 may be assigned differently depending on the TF-IDF value.

The API classifying unit 17 may classify the vectorized API feature information through the trees that constitute the API classifier. The API classifying unit 17 may obtain classification result values (−0.5, +2.0) for each tree of the API classifier according to the vector value of the API feature information.

The API classifying unit 17 may sum up the classification result values for each tree of the API classifier, and when the sum value is a positive number, may classify the corresponding API as malicious, and when the sum value is a negative number, may classify the corresponding API as benign.

The API classifying unit 17 may input API that constitutes the target dataset into each of the ten API classifiers and obtain ten classification results for each API.

The API classifying unit 17 may calculate security vulnerability score of the API that constitute the target dataset by averaging the plurality of classification results of the corresponding API.

For example, when nine of the ten API classifiers classify a certain API that constitutes the target dataset as malicious, the API classifying unit 17 may calculate and assign the security vulnerability score of the corresponding API as 0.9.

As described above, the API classifying unit 17 may construct an Ensemble Model and assign the quantitative security vulnerability score to the API.

The security vulnerability ranking generation unit 19 may set security vulnerability rankings divided according to the security vulnerability scores, and map the security vulnerability rankings to each API that constitutes the target dataset according to the security vulnerability scores.

For example, the security vulnerability ranking generation unit 19 may set a total of eleven security vulnerability rankings from 0.0 to 1.0 according to the security vulnerability scores. The security vulnerability ranking generation unit 19 may map the APIs assigned with the security vulnerability scores corresponding to each security vulnerability ranking and store in the database 30.

Figure 5:
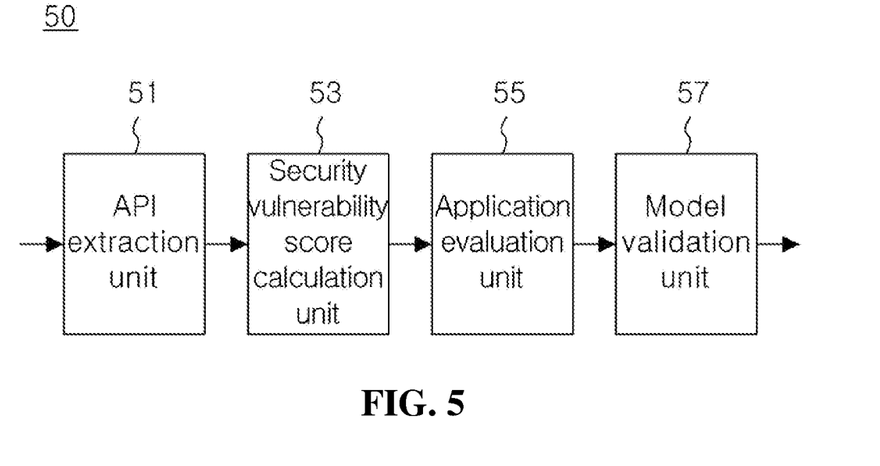
FIG. 5 is a detailed block diagram of an API evaluation unit shown in FIG. 1.

FIG. 5 is a detailed block diagram of the API evaluation unit shown in FIG. 1.

Referring to FIG. 5, the API evaluation unit 50 may include an API extraction unit 51, a security vulnerability score calculation unit 53, an application evaluation unit 55 and a model validation unit 57.

The API extraction unit 51 may extract API used in a target application. The API extraction unit 51 may extract all APIs used in the target application and generate an API list.

The security vulnerability score calculation unit 53 may calculate security vulnerability score for the API list.

In detail, the security vulnerability score calculation unit 53 may identify and assign security vulnerability rankings of each API included in the API list using the database 30.

The security vulnerability score calculation unit 53 may identify the number of APIs for each security vulnerability ranking. That is, the security vulnerability score calculation unit 53 may identify the number of APIs assigned with each security vulnerability ranking for each security vulnerability ranking among the total number of APIs that form the API list.

The security vulnerability score calculation unit 53 may assign weights for each security vulnerability ranking to each of the number of APIs for each security vulnerability ranking, and sum up all of the values. For example, the security vulnerability score calculation unit 53 may multiply the number of APIs assigned with the security vulnerability ranking of 1.0 by the weight of 1, multiply the number of APIs assigned with the security vulnerability ranking of 0.9 by the weight of 0.9, and sum up all of the values.

The security vulnerability score calculation unit 53 may calculate the security vulnerability score for the API list by dividing the sum of the number of APIs assigned with the weights for each security vulnerability ranking by the total number of APIs that form the API list.

When the security vulnerability score for the API list of the target application is equal to or less than the reference score (for example, 0.5), the application evaluation unit 55 may evaluate the corresponding application as a benign application. That is, when the security vulnerability score for the API list of the target application is equal to or less than the reference score, the application evaluation unit 55 may evaluate the corresponding application as a benign application containing no malware.

When the security vulnerability score for the API list of the target application exceeds the reference score, the application evaluation unit 55 may evaluate the corresponding application as a malicious application. That is, when the security vulnerability score for the API list of the target application exceeds the reference score, the application evaluation unit 55 may evaluate the corresponding application as a malicious application containing malware.

In this case, the dataset update unit 70 will add, as the training dataset, the API list evaluated as a malicious application.

The model validation unit 57 may set the reference score using the target application evaluation result at the application evaluation unit 55.

The model validation unit 57 may set the reference score that can classify the application as a malicious application or a benign application best. For example, the model validation unit 57 may allow a manager to evaluate the classification result of the application and re-set the currently set reference score according to a predefined criterion.

Hereinafter, a method of application security vulnerability evaluation based on tree boosting according to an embodiment of the present disclosure will be described.

The method of application security vulnerability evaluation based on tree boosting according to an embodiment of the present disclosure may be performed under substantially the same configuration as the apparatus 1000 for application security vulnerability evaluation based on tree boosting according to an embodiment of the present disclosure as shown in FIG. 1. Accordingly, the same component as the apparatus 1000 of FIG. 1 is given the same reference sign, and redundant descriptions are omitted herein.

Figure 6:
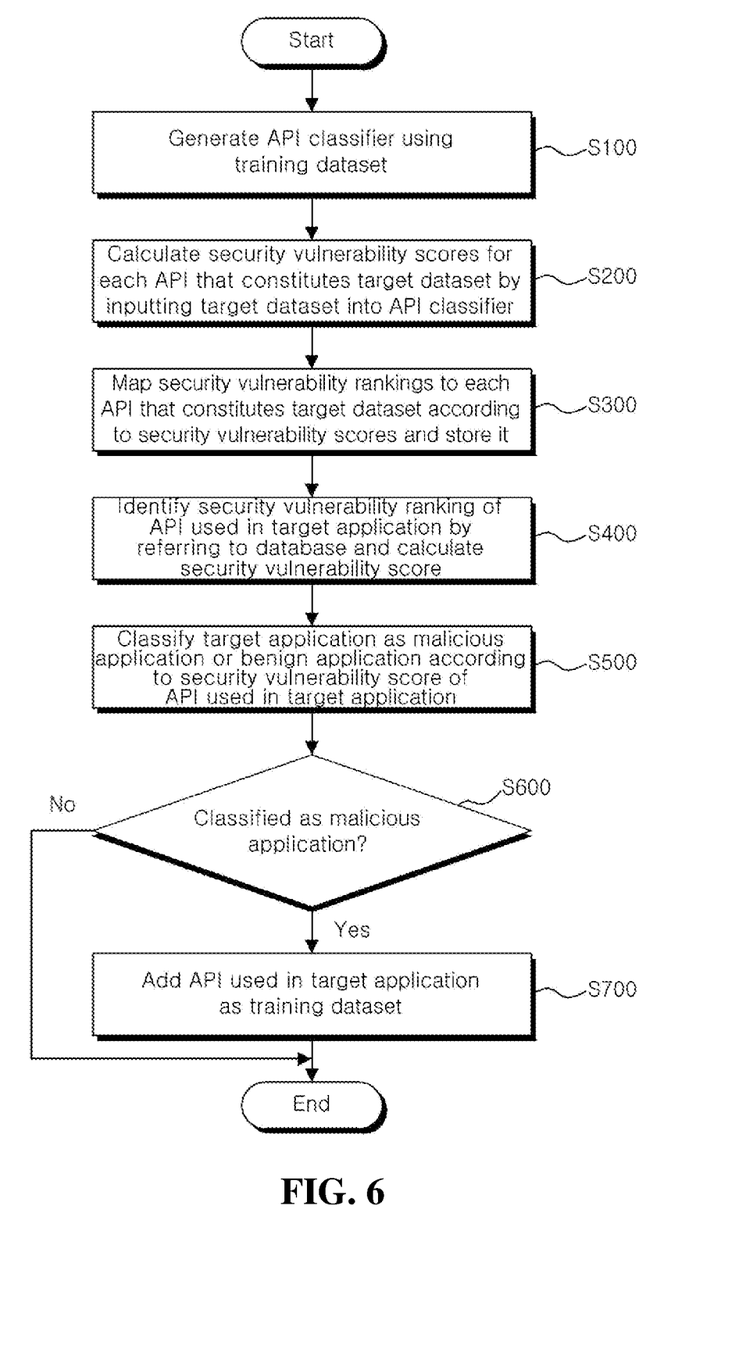
FIG. 6 is a flowchart of a method of application security vulnerability evaluation based on tree boosting according to an embodiment of the present disclosure.

FIG. 6 is a flowchart of the method of application security vulnerability evaluation based on tree boosting according to an embodiment of the present disclosure.

Referring to FIG. 6, the API learning unit 10 may generate an API classifier using a training dataset (S100).

The API learning unit 10 may generate the API classifier that learns the training dataset with a tree boosting-based algorithm and classifies an input API as benign or malicious.

The training dataset may include API feature information of applications classified as a malicious application or a benign application. Here, the API feature information may include the API name, package to which the API belongs, class to which the API belongs and description of the API.

The API learning unit 10 may generate a plurality of API classifiers to construct an Ensemble Model. This embodiment is described, taking the API learning unit 10 generates ten API classifiers as an example.

A description of the method generating the API classifier according to the tree boosting-based algorithm with the Ensemble Model Technique is replaced by the above description.

The API learning unit 10 may calculate security vulnerability scores for each API by inputting the target dataset into the API classifier (S200).

The API learning unit 10 may calculate the security vulnerability scores for each API by inputting the target dataset into the plurality of API classifiers. The target dataset may include feature information of all APIs provided at a reference site of an Android application.

The API learning unit 10 may calculate the security vulnerability score of API that constitutes the target dataset by averaging a plurality of classification results of the corresponding API.

For example, when nine of the ten API classifiers classify a certain API that constitutes the target dataset as malicious, the API classifying unit 17 may calculate and assign the security vulnerability score of the corresponding API as 0.9.

The API learning unit 10 may map security vulnerability rankings to each API that constitutes the target dataset according to the security vulnerability scores and store it (S300).

The API learning unit 10 may set security vulnerability rankings divided according to the security vulnerability scores, and map the security vulnerability rankings to each API that constitutes the target dataset according to the security vulnerability scores and store it.

For example, the API learning unit 10 may set a total of eleven security vulnerability rankings from 0.0 to 1.0 according to the security vulnerability scores. The API learning unit 10 may map APIs assigned with the security vulnerability scores corresponding to each security vulnerability ranking and store in the database 30.

The API evaluation unit 50 may identify security vulnerability ranking of API used in a target application by referring to the database 30 and calculate security vulnerability score (S400), and classify the target application as a malicious application or a benign application according to the security vulnerability score of the target application (S500).

The API evaluation unit 50 may generate an API list by extracting all APIs used in the target application.

The API evaluation unit 50 may calculate security vulnerability score for the API list.

For example, the API evaluation unit 50 may identify and assign security vulnerability rankings of each API included in the API list using the database 30.

The API evaluation unit 50 may identify the number of APIs for each security vulnerability ranking. That is, the security vulnerability score calculation unit 53 may identify the number of APIs assigned with each security vulnerability ranking for each security vulnerability ranking among the total number of APIs that form the API list.

The API evaluation unit 50 may assign weights for each security vulnerability ranking to each of the number of APIs for each security vulnerability ranking, and sum up all of the values. For example, the security vulnerability score calculation unit 53 may multiply the number of APIs assigned with the security vulnerability ranking of 1.0 by the weight of 1 and the number of APIs assigned with the security vulnerability ranking of 0.9 by the weight of 0.9, and sum up all of the values.

The API evaluation unit 50 may calculate the security vulnerability score for the API list by dividing the sum of the number of APIs assigned with the weights for each security vulnerability ranking by the total number of APIs that form the API list.

When the security vulnerability score for the API list of the target application is equal to or less than the reference score (for example, 0.5), the API evaluation unit 50 may evaluate the corresponding application as a benign application. When the security vulnerability score for the API list of the target application exceeds the reference score, the API evaluation unit 50 may evaluate the corresponding application as a malicious application.

When the target application is classified as a malicious application (S600), the dataset update unit 70 may add the API used in the target application as the training dataset (S700).

The method of application security vulnerability evaluation based on tree boosting according to the present disclosure as described above may be implemented as an application or in the form of program commands that may be executed through various computer components and may be recorded in computer-readable recording media. The computer-readable recording media may include program commands, data files and data structures, alone or in combination.

The program commands recorded in the computer-readable recording media may be specially designed and configured for the present disclosure, and may be those known and available to those having ordinary skill in the field of computer software.

Examples of the computer-readable recording media include hardware devices specially designed to store and execute program commands, for example, magnetic media such as hard disk, floppy disk and magnetic tape, optical media such as CD-ROM and DVD, magneto-optical media such as floptical disk, and ROM, RAM and flash memory.

Examples of the program command include machine code generated by a compiler as well as high-level language code that can be executed by a computer using an interpreter. The hardware device may be configured to act as one or more software modules to perform the processing according to the present disclosure, or vice versa.

While the present disclosure has been hereinabove described with reference to the embodiments, it will be appreciated by those having ordinary skill in the technical field pertaining to the present disclosure that various modifications and changes may be made thereto without departing from the spirit and scope of the present disclosure defined in the appended claims.

DETAILED DESCRIPTION OF MAIN ELEMENTS

1000: Apparatus for application security vulnerability evaluation based tree boosting
10: API learning unit
30: Database
50: API evaluation unit
70: Dataset update unit

What is claimed is:

1. A method of vulnerability evaluation of an apparatus having a processor and a memory for application security vulnerability evaluation based on tree boosting, the method comprising:

generating an API classifier which classifies an input API as benign or malicious using a tree boosting-based algorithm;

assigning a security vulnerability score to the API inputted into the API classifier according to a benign or a malicious classification result of the API and storing in a database, wherein the security vulnerability score indicates security vulnerability in a quantitative value;

calculating the security vulnerability score of the API used in a target application using the security vulnerability score of each of the API stored in the database; and classifying the target application as a malicious application or a benign application according to the security vulnerability score of the API used in the target application, wherein the step of generating the API classifier which classifies the input API as benign or malicious using the tree boosting-based algorithm comprises:

extracting the API used in the application classified as the malicious application or the benign application and generating into a training dataset;

performing character string pre-processing on API feature information that constitutes the training dataset; and vectorizing the training dataset having undergone the character string pre-processing by calculating an importance of each word, and wherein the step of assigning the security vulnerability score to the API inputted into the API classifier according to the benign or the malicious classification result of the corresponding API and storing in the database comprises:

extracting APIs used in all applications provided at an Android reference site to generate a target dataset;

performing character string pre-processing on API feature information that constitutes the target dataset; and vectorizing the target dataset having undergone the character string pre-processing by calculating an importance of each word.

2. The method of vulnerability evaluation of claim 1, further comprising:

adding the API used in the target application as the training dataset to generate the API classifier, when the target application is classified as the malicious application.

3. The method of vulnerability evaluation of claim 1, wherein the step of the generating the API classifier further comprises:

generating the API classifier by learning the training dataset with the tree boosting-based algorithm; and generating a plurality of API classifiers by repeating the step of the generating the API classifier by learning the training dataset with the tree boosting-based algorithm to construct an Ensemble model.

4. The method of vulnerability evaluation of claim 3, wherein the step of the assigning the security vulnerability score to the API inputted into the API classifier according to the benign or malicious classification result of the API and storing in the database further comprises:

inputting the target dataset into the Ensemble model to obtain the benign or the malicious classification result of each of the API that constitutes the target dataset for each of the plurality of API classifiers that constitutes the Ensemble model;

calculating the security vulnerability score of each of the API that constitutes the target dataset by averaging the benign or malicious classification results of each of the API that constitutes the target dataset acquired for each of the plurality of API classifiers; and setting security vulnerability rankings divided according to the security vulnerability score, and mapping the security vulnerability rankings to each of the API that constitutes the target dataset according to the security vulnerability score and storing in the database.

5. The method of vulnerability evaluation of claim 1, wherein the step of the calculating the security vulnerability score of the API used in the target application using the security vulnerability score for each of the API stored in the database comprises:

extracting all APIs used in the target application to generate an API list; and averaging the security vulnerability score of each of the API included in the API list using the database and calculating as the security vulnerability score of the API used in the target application.

6. A non-transitory computer-readable recording medium having recorded thereon a computer program for the method of application security vulnerability evaluation based on tree boosting of claim 1.

7. An apparatus for application security vulnerability evaluation based on tree boosting, the apparatus comprising:

an API learning unit which generates an API classifier which classifies an input API as benign or malicious using a tree boosting-based algorithm, and assigns a security vulnerability score to the API inputted into the API classifier according to a benign or a malicious classification result of the API and stores in a database; and an API evaluation unit which calculates security vulnerability score of the API used in a target application using the security vulnerability score of each of the API stored in the database, and classifies the target application as a malicious application or a benign application according to the security vulnerability score of the API used in the target application, wherein the API learning unit comprises:

an API classifying unit which extracts API used in an application classified as the malicious application or the benign application and generates into a training dataset, extracts APIs used in all applications provided at an Android reference site to generate a target dataset;

a character string pre-processing unit which performs character string pre-processing on API feature information that constitutes the training dataset or the target dataset; and a TF-IDF vector generation unit which vectorizes the training dataset or the target dataset having undergone the character string pre-processing by calculating an importance of each word.

8. The apparatus for application security vulnerability evaluation based on tree boosting of claim 7, further comprising:

a dataset update unit which adds the API used in the target application as the training dataset to generate the API classifier when the target application is classified as the malicious application.

9. The apparatus for application security vulnerability evaluation based on tree boosting of claim 7, wherein the API learning unit further comprises:

an API classifying unit which generates a plurality of API classifiers by learning the training dataset with the tree boosting-based algorithm to construct an Ensemble model, obtains the benign or the malicious classification results of each of the API which constitutes the target dataset for each of the plurality of API classifiers, and calculates security vulnerability scores for each API which constitutes the target dataset; and a security vulnerability ranking generation unit which sets security vulnerability rankings divided according to the security vulnerability score, and maps the security vulnerability rankings to each of the API that constitutes the target dataset according to the security vulnerability score and stores in the database.

10. The apparatus for application security vulnerability evaluation based on tree boosting of claim 7, wherein the API evaluation unit comprises:

an API extraction unit which extracts all APIs used in the target application to generate an API list;

a security vulnerability score calculation unit which averages the security vulnerability score of each of the API included in the API list using the database and calculates as the security vulnerability score of the API used in the target application;

an application evaluation unit which classifies the target application as a malicious application or a benign application according to the security vulnerability score of the API used in the target application; and a model validation unit which sets a classification reference score of a malicious application or a benign application for the security vulnerability score of the API used in the target application.

* * * * *